United States Patent
Vassilieff

(10) Patent No.: US 8,712,629 B2
(45) Date of Patent: Apr. 29, 2014

(54) METHOD AND DEVICE FOR DETECTING THE DYSFUNCTION OF A GAS PRESSURE SENSOR IN A VEHICLE TIRE

(75) Inventor: Youri Vassilieff, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 13/579,107

(22) PCT Filed: Feb. 18, 2011

(86) PCT No.: PCT/EP2011/000791
§ 371 (c)(1),
(2), (4) Date: Aug. 15, 2012

(87) PCT Pub. No.: WO2011/101160
PCT Pub. Date: Aug. 25, 2011

(65) Prior Publication Data
US 2012/0310469 A1      Dec. 6, 2012

(30) Foreign Application Priority Data
Feb. 22, 2010   (FR) .................... 10 00712

(51) Int. Cl.
*G01M 17/02*   (2006.01)
(52) U.S. Cl.
USPC ................................. 701/30.3
(58) Field of Classification Search
USPC ........................................... 701/30.3
See application file for complete search history.

(56) References Cited

U.S. PATENT DOCUMENTS

| | | | | |
|---|---|---|---|---|
| 6,809,637 B1* | 10/2004 | Brown | ........................ | 340/443 |
| 7,551,069 B2* | 6/2009 | Cohen | ........................ | 340/442 |
| 2006/0058977 A1* | 3/2006 | Zhu | .............................. | 702/148 |
| 2006/0156802 A1* | 7/2006 | Cohen | ............................ | 73/146 |
| 2008/0243423 A1* | 10/2008 | Irth et al. | ...................... | 702/138 |
| 2010/0083747 A1* | 4/2010 | Fink et al. | ..................... | 73/146.5 |
| 2010/0179796 A1* | 7/2010 | Miyamoto | ........................ | 703/8 |

FOREIGN PATENT DOCUMENTS

| DE | 10 2006 005143 A1 | 8/2007 |
|---|---|---|
| DE | 10 2008 049 047 | * 4/2010 |

OTHER PUBLICATIONS

International Search Report, dated May 12, 2011, from corresponding PCT application.

* cited by examiner

*Primary Examiner* — Mary Cheung
*Assistant Examiner* — Anne Mazzara
(74) *Attorney, Agent, or Firm* — Young & Thompson

(57) ABSTRACT

A method (2) for detecting the malfunctioning of a sensor (11) of the pressure of a gas inside a tire of a vehicle includes at least a step (20) of determining whether a predefined gas temperature variation detection criterion is verified. If a temperature variation is detected, the method (2) includes a step (21) of determining whether a predefined criterion for detection of the variation of the pressure, measured by the pressure sensor (11), is verified. If a pressure variation is not detected, the method (2) includes a step (22) of notifying that a malfunction of the pressure sensor (11) has been detected. A device for detecting the malfunctioning of a sensor (11) of the pressure of a gas inside a tire of a vehicle is also described.

18 Claims, 3 Drawing Sheets

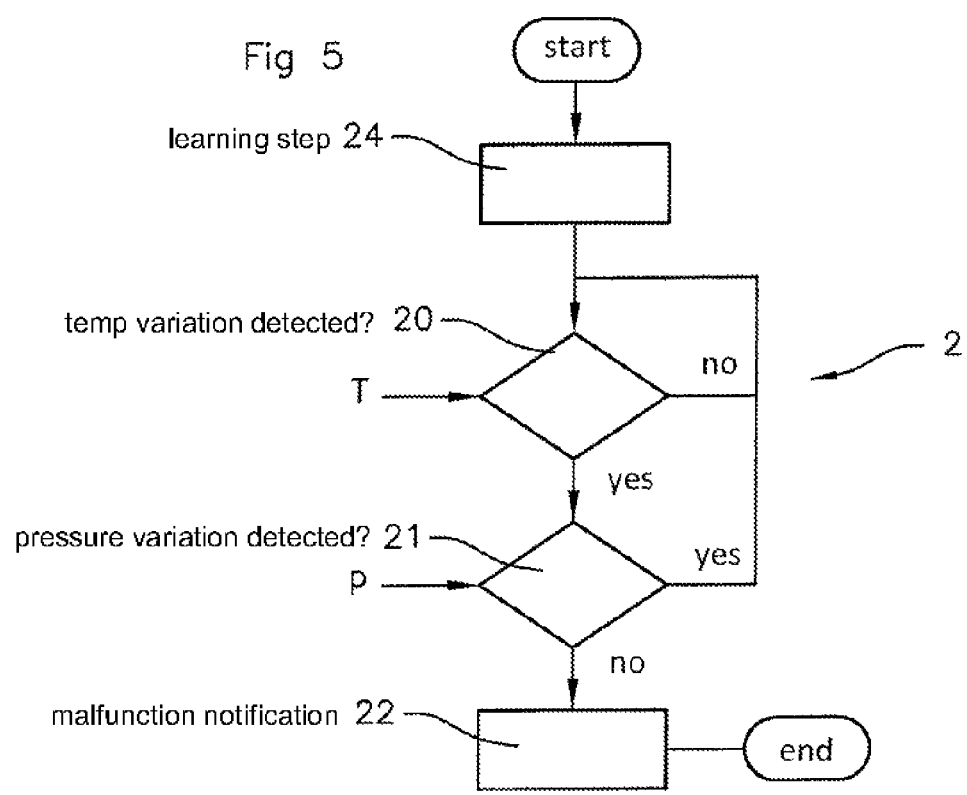

METHOD AND DEVICE FOR DETECTING THE DYSFUNCTION OF A GAS PRESSURE SENSOR IN A VEHICLE TIRE

BACKGROUND OF THE INVENTION

The present invention relates to a method and a device for detecting the malfunctioning of a vehicle tire pressure sensor.

DESCRIPTION OF RELATED ART

Motor vehicles are increasingly including systems for monitoring parameters such as the pressure and/or temperature of the tires of the wheels of the vehicle in order to inform the driver of the vehicle of any abnormal variation in the measured parameters.

These monitoring systems generally comprise a central processing unit, mounted in the vehicle, and a wheel unit mounted on each of the wheels of the vehicle, the role of which is notably to measure the pressure of the tire of the wheel on which it is mounted.

A wheel unit generally takes the form of an electronic module, notably comprising a pressure sensor, a microprocessor, and a radiofrequency transmitter for transmitting the pressure measurements to the central processing unit.

In order to reduce the risks of malfunction of the wheel unit, in particular for the pressure measurements, it is possible, for example, to provide it with at least two pressure sensors in order to ensure a redundancy of the pressure measurements. One limitation with this solution lies mainly in its production cost, because of the duplication of certain elements.

There is no known solution for detecting that a tire pressure sensor is defective and that, consequently, the pressure measurements performed by this pressure sensor must be discarded. This problem arises whatever the number of pressure sensors in the wheel unit. In practice, even in a redundant system provided with two pressure sensors, there is no known solution for detecting the simultaneous failure of both the pressure sensors, and/or, if a single pressure sensor has failed, determining which pressure sensor has failed.

SUMMARY OF THE INVENTION

The aim of the present invention is to propose a solution for detecting the malfunctioning of a pressure sensor, which is applicable to any type of vehicle tire pressure sensor and preferably to any type of tire and any type of vehicle.

To resolve the abovementioned problems, the subject of the present invention is a method for detecting the malfunctioning of a sensor of the pressure of a gas inside a tire of a vehicle, characterized in that it comprises at least:
  a step of determining whether a predefined gas temperature variation detection criterion is verified,
  if a gas temperature variation is detected: a step of determining whether a predefined criterion for detection of the variation of the pressure, measured by the pressure sensor, is verified,
  if a pressure variation is not detected: a step of notifying that a malfunction of the pressure sensor has been detected.

According to particular embodiments, the method comprises one or more of the following characteristics, taken alone or in all technically possible combinations:
  the temperature variation detection criterion is a vehicle speed decrease detection criterion, and the pressure variation detection criterion is a pressure increase detection criterion,
  the method comprises a preliminary learning step during which the speed decrease detection criterion and the pressure increase detection criterion are defined by comparing vehicle speed measurements and pressure measurements associated with said speed measurements,
  the vehicle speed measurements and the pressure measurements, according to which the speed decrease and pressure increase detection criteria are defined, are performed at the start of the commissioning of the pressure sensor,
  the vehicle speed decrease detection criterion is verified when the deceleration is greater as an absolute value than a predefined threshold, preferably a threshold of 0.3 g, in which g is the gravitational acceleration,
  the pressure increase detection criterion is verified when the pressure increase is greater than a predefined threshold, preferably a threshold of 10 kilopascals,
  the step of notifying that a malfunction of the pressure sensor has been detected is executed if the pressure variation detection criterion has not been verified a number of times consecutively.

Also the subject of the present invention is a device for detecting the malfunctioning of a sensor of the pressure of a gas inside a tire of a vehicle, characterized in that it comprises at least:
  means for determining whether a predefined gas temperature variation detection criterion is verified,
  means for determining whether a predefined criterion for detection of the variation of the pressure, measured by the pressure sensor, is verified, implemented when a temperature variation has been detected,
  means for notifying that a malfunction of the pressure sensor has been detected, implemented when a pressure variation has not been detected.

Preferably, the device comprises means for measuring the variation of the speed of the vehicle, and the gas temperature variation and pressure variation detection criteria are respectively speed decrease and pressure increase detection criteria.

Preferably, the device comprises means for defining the speed decrease and pressure increase detection criteria by comparing vehicle speed measurements and pressure measurements associated with said speed measurements.

BRIEF DESCRIPTION OF THE DRAWINGS

The invention will be better understood on reading the following description of implementations and embodiments of the invention, which are not limiting on the invention, and given with reference to the figures which represent.

DETAILED DESCRIPTION OF THE INVENTION

The present invention relates to a method and a device for detecting the malfunctioning of a sensor of the pressure of a gas inside a tire of a vehicle.

Figure 1:
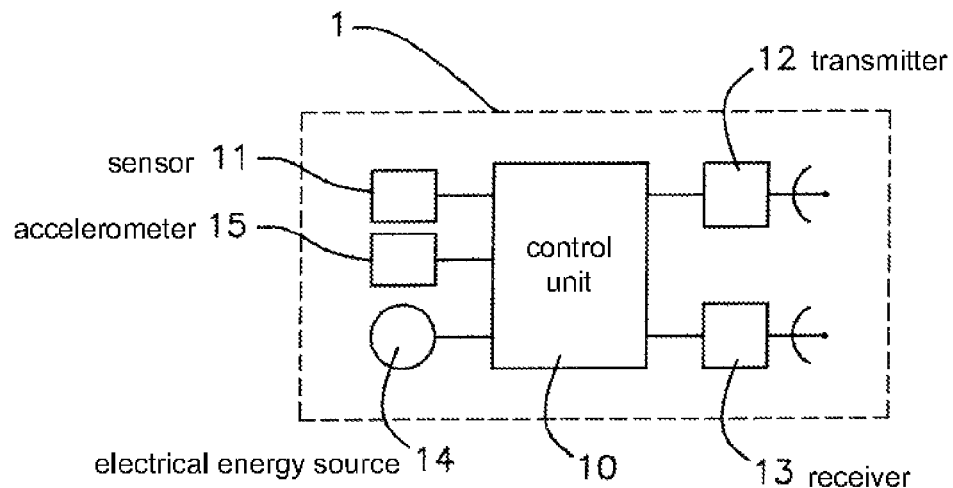
FIG. 1, a schematic representation of an exemplary malfunction detection device according to the invention, FIGS. 2, 3, 4 and 5, diagrams representing examples of implementation of the malfunction detection method according to the invention.

FIG. 1 represents, highly schematically, an exemplary embodiment of a device 1 suitable for implementing the malfunction detection method according to the invention.

In practice, the device 1 is intended to be incorporated in a monitoring system of a motor vehicle, said system comprising a central processing unit, mounted in the vehicle, and a wheel unit mounted on each of the wheels of the vehicle.

More particularly, the device 1 is intended to be wholly or partly incorporated in a wheel unit (not represented), with which a wheel of the vehicle is equipped, in order to detect the malfunction of a pressure sensor installed in said wheel unit. Preferably, the device 1 is entirely incorporated in such a wheel unit, but, according to other embodiments, there is nothing to preclude it from being distributed between a wheel unit and the central processing unit.

Hereinafter in the description, the case where the device 1 is incorporated in a wheel unit is taken in a nonlimiting manner.

The malfunction detection device 1 comprises a control unit 10 of the programmed computer type, notably comprising at least a processor linked to one or more electronic memories containing program code instructions to be executed in order to implement the malfunction detection method.

The control unit 10 is linked to peripheral devices which include one or more sensors 11 for measuring parameters of the tire, at least one of which is a pressure sensor. According to certain embodiments, the device 1 also comprises a temperature sensor.

Preferably, the device 1 comprises a radiofrequency transmitter 12 which is implemented at least to transmit, to the central processing unit mounted in the vehicle, information concerning the measurements (for example of pressure and of temperature) performed.

There is nothing to preclude the device 1 from including other elements. As an example, said device also comprises a radiofrequency receiver 13 as well as an electrical energy source of button-cell type 14.

The invention, in principle, relies on the observation that a variation of the temperature of a gas, when it occurs at substantially constant volume and substantially constant quantity of this gas is accompanied by a variation of the pressure of this gas.

This relationship is expressed, for example, in the case of a pure gas, in the following form:

$$pV = nRT \quad (1)$$

an expression in which:
p is the pressure of the gas expressed in Pascals (Pa),
V is the volume occupied by the gas, expressed in cubic meters ($m^3$),
n is the quantity of gas, expressed in moles,
R is the universal constant of pure gases,
T is the absolute temperature of the gas, expressed in Kelvins (K).

In a vehicle tire, the assumption of substantially constant quantity of gas and of substantially constant volume is valid in normal conditions of use (valve closed, tire undamaged, etc.) and over a short period, of the order of a minute.

It will therefore be understood that, in normal conditions of use and over a short period, an increase (respectively a decrease) in the temperature of the gas T inside the tire should be accompanied, according to the equation (1), by an increase (respectively a decrease) in the pressure p measured by the pressure sensor 11. If such is not the case, it is probable that said pressure sensor is exhibiting a malfunction.

It will also be understood that this relationship is independent of the type of pressure sensor implemented and that, consequently, the invention is applicable to any type of pressure sensor.

Figure 2:
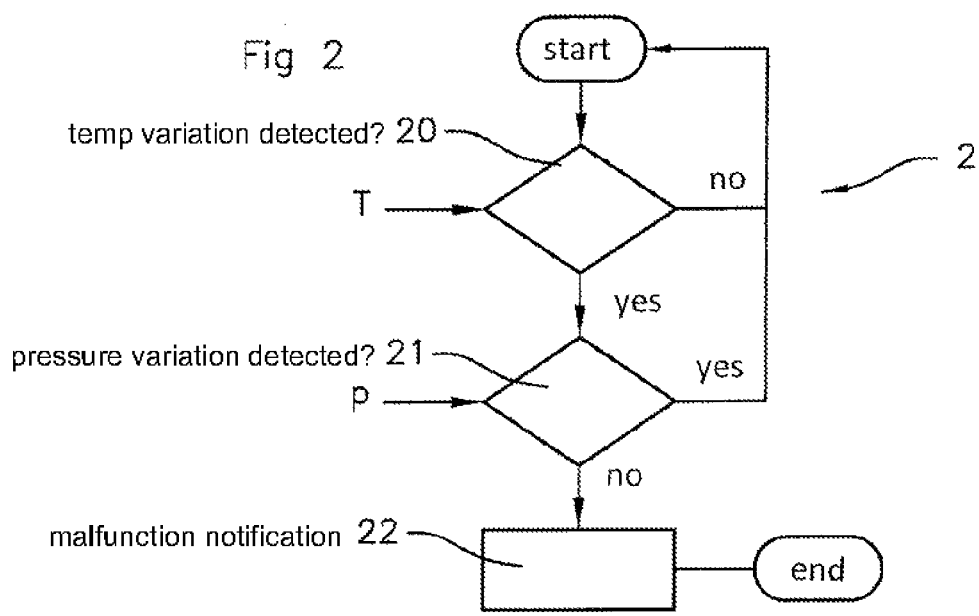

FIG. 2 represents a particular embodiment of the pressure sensor malfunction detection method 2.

As illustrated by FIG. 2, the method 2 mainly comprises a step 20 of determining whether a predefined gas temperature T variation detection criterion is verified, and, if a temperature variation is detected, a step 21 of determining whether a predefined criterion for detection of the variation of the pressure p, measured by the pressure sensor 11, is verified.

If a pressure variation is not detected, the malfunction detection method also comprises a step 22 of notifying that a malfunction of the pressure sensor 11 has been detected. This step 22 for example uses the radiofrequency transmitter 12, to notify the central processing unit that a malfunction has been detected.

As illustrated by FIG. 2, the malfunction notification step 22 is, for example, executed as soon as the pressure variation detection criterion is not verified. In other words, it is sufficient for said pressure p variation detection criterion not to be verified once for the pressure sensor 11 to be considered to have failed.

Figure 3:
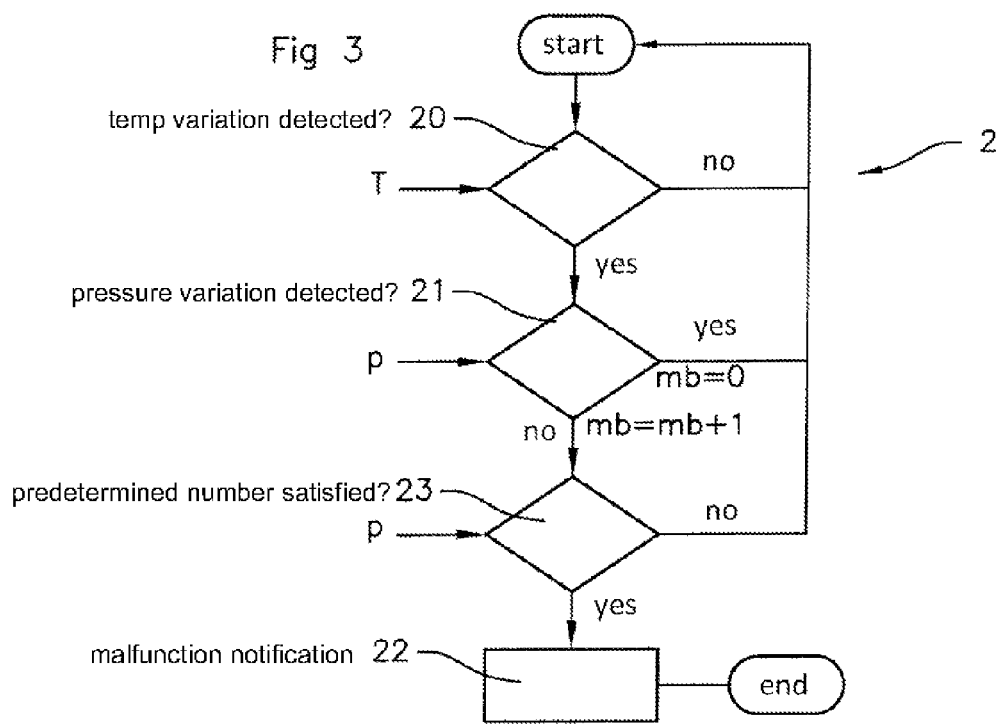

According to another example, illustrated by FIG. 3, the malfunction notification step 22 is executed only if the pressure p variation detection criterion is not verified a number of times consecutively.

The expression "a number of times consecutively" should be understood to mean a number of successive executions of the step 21 of determining whether said pressure p variation detection criterion is verified, the execution of the step 21 being conditional on the prior verification of the temperature T variation detection criterion.

As represented in FIG. 3, the method 2 comprises, according to this example, a step 23 of determining whether the pressure p variation detection criterion has not been verified a predetermined number Mb of times consecutively, in which Mb is, for example, equal to three or more. For this, a counter mb is incremented when the pressure variation detection criterion is not verified. The value of the counter mb is compared with the predetermined number Mb during the step 23. When the pressure variation detection criterion is verified, the value of the counter mb is then forced to zero.

The temperature T variation detection criterion is, for example, verified when the variation of the temperature, over a predefined period, for example of the order of a second, is greater as an absolute value than a threshold, for example of the order of 10 K.

The pressure p variation detection criterion is, for example, verified when the variation of the pressure, over a predefined period, preferably of the same duration as for the temperature variation, is greater as an absolute value than a threshold, for example of the order of 10 kilopascals (kPa) (and goes in the same direction—increase or decrease—as the temperature variation).

In practice, at ambient temperature, or approximately at 300 K, and for an absolute pressure of the gas inside the tire of approximately 300 kPa, it has been found that an increase of 1 K results in an increase of approximately 1 kPa.

These examples of temperature variation and pressure variation detection criteria are not limiting, and it will be understood that other temperature variation and pressure variation detection criteria can be considered without the invention being modified in its principle.

The step 20 of determining whether a temperature variation detection criterion is verified, for example directly uses the measurements of the temperature T, performed by a temperature sensor 11 of the device 1.

However, it has proved in practice difficult to measure, with sufficient accuracy and responsiveness, the temperature of the gas inside a tire. This is because, although the current wheel units are provided with temperature sensors, these are generally arranged in proximity to (or on) the wheel rim, and the measured temperature is more often than not the temperature of said wheel rim, which may be different from that of the gas in the tire.

Furthermore, the temperature measurement is generally obtained with a delay relative to the real temperature. In other words, the measurement of the temperature is not representative of the instantaneous temperature of the gas, but rather corresponds to the temperature of the gas a few minutes previously. This is all the more of a nuisance when, over a few minutes, the number n of moles of gas may have changed, and the assumed relationship between the temperature and pressure variations is no longer valid.

Furthermore, rapid variations of the temperature of the gas are generally filtered and do not appear in the measurement obtained.

For all these reasons, a preferred implementation of the method 2, compatible with any one of the preceding implementations, consists in using measurements of the speed V variation of the vehicle, and in considering that a rapid and significant increase in the temperature T can be detected only when an abrupt decrease in speed V is detected.

Figure 4:
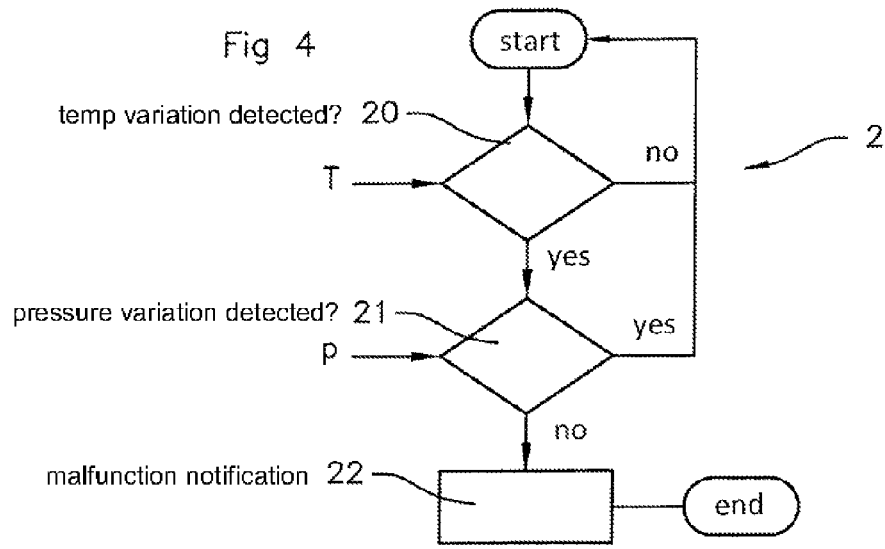

According to this implementation of the method 2, represented in FIG. 4, an priori knowledge of the behavior of the temperature of the gas inside the tire, given below, is exploited.

When the vehicle decelerates rapidly, that is to say in the case of significant braking, it is known a priori that the temperature of the tire will increase significantly because, on the one hand, the cooling of the tire by the ambient air reduces as the speed of the vehicle reduces and, on the other hand, because of the friction forces to which the rubber of the tire is then subjected.

A heating of the tire is reflected very quickly, generally in less than a minute, in a heating of the gas inside the tire, because the heat exchange surface between the tire and the gas is very significant (tread of the tire).

It can therefore be considered, during the step 20 of the method 2, that determining whether a significant temperature increase detection criterion is verified is substantially equivalent to determining whether an abrupt speed decrease detection criterion is verified. In this case, the pressure variation detection criterion is also a pressure increase detection criterion.

According to a suitable embodiment of the device 1, the latter comprises means for measuring the variation of the speed of the vehicle, such as an accelerometer 15, schematically represented in FIG. 1, or any other means known to those skilled in the art.

However, there is nothing to preclude the measurements of variation of speed of the vehicle from not being directly performed by the device 1 but being received, for example, from the central processing unit via the radiofrequency receiver 13.

The vehicle speed decrease detection criterion is, for example, verified when the deceleration of the vehicle is greater as an absolute value than a threshold, for example of the order of 0.3 g (in which g is the gravitational acceleration, substantially equal to 9.81 m/s$^2$).

It is generally accepted that the maximum braking for a large passenger vehicle is in the region of −1 g (or a decrease in speed of 9.81 m/s each second). It can be considered that the speed decrease detection criterion is verified when the deceleration is between −0.3 g and −1 g (−0.3 g corresponding to a decrease in speed of approximately 10 kms/hour in one second).

According to another example, the speed decrease detection criterion is verified when, over a time interval of predefined duration, for example of the order of a second, a ratio $\Delta v/v_0$ between a variation $\Delta v$ in the speed over this interval and a reference speed $v_0$ over this interval (for example the speed at the start of this interval, the average speed over this interval, etc.) is greater as an absolute value than a threshold, for example greater than 50%.

These examples of speed decrease detection criteria are not limiting, and it will be understood that other speed decrease detection criteria can be considered without the invention being modified in its principle.

According to a preferred implementation, compatible with any one of the preceding embodiments, the method 2 comprises a preliminary learning step 24 during which the various criteria to be verified are defined by comparing vehicle speed measurements and pressure measurements associated with said speed measurements.

This implementation is represented in FIG. 5. In practice, the relationship between the variations in the speed and the variations in the pressure depends on the type of tire and the type of vehicle, because the increase in temperature, accompanying a decrease of speed, depends notably on the material from which the tire is made, on the weight of the vehicle, on its drag coefficient, etc.

The learning step 24 is advantageously executed at the start of commissioning of the vehicle pressure sensor 11. In other words, the learning step 24 is executed when it can be assumed that the pressure sensor 11 is not exhibiting any malfunction. For example, the learning step 24 is executed in the first 100 kilometers traveled by the vehicle and/or the wheel unit containing the pressure sensor 11.

The learning step 24 makes it possible, for example, to define the thresholds for the various criteria. For example, it may be possible to define a priori an increase in pressure to be observed, for example 10 kPa, and to determine, by the successive measurements performed, the minimal decrease in the speed of the vehicle that makes it possible to observe this increase of 10 kPa.

It will therefore be understood that, when the learning step 24 is executed, the malfunction detection method 2 can be adapted to any type of tire and any type of vehicle.

According to other implementations in which the learning step 24 is not executed, the different criteria implemented are, for example, previously defined by simulation and/or by measurement on a reference vehicle provided with reference tires, and are stored in a non-volatile memory of the device 1.

The malfunction detection device 1 comprises, in addition to the elements already described, a set of means making it possible to implement the method 2.

These means mainly take the form of program code instructions, stored in electronic memories which, when executed by a microprocessor of the control unit 10, ensure the implementation of the malfunction detection method 2. These means also comprise, according to certain embodiments, dedicated electronic circuits, of ASIC, FPGA and similar types.

The device 1 notably comprises:
means for determining whether the gas temperature variation detection criterion is verified,
means for determining whether the criterion for detection of the variation of the pressure, measured by the pressure sensor 11, is verified, implemented when a temperature variation has been detected,
means for notifying that a malfunction of the pressure sensor 11 has been detected, implemented when a pressure variation has not been detected.

If necessary, the device 1 comprises means for defining the speed decrease detection criterion and the pressure increase detection criterion, by comparing vehicle speed measurements and pressure measurements concurrent with said speed measurements.

The invention claimed is:

1. A method (2) for detecting a malfunctioning of a sensor (11) of pressure of a gas inside a tire of a vehicle, comprising:
    a device comprising a pressure sensor executing a step (20) of determining whether a predefined gas temperature variation detection criterion is verified,
    when the device determines that a temperature variation is detected, the device executing a step (21) of determining whether a predefined criterion for detection of a pressure variation, measured by the pressure sensor, is verified,
    when the device determines that a pressure variation is not detected, the device executing a step (22) of notifying that a malfunction of the pressure sensor has been detected.

2. The method as claimed in claim 1, in which the temperature variation detection criterion is a vehicle speed decrease criterion, and the pressure variation detection criterion is a pressure increase detection criterion.

3. The method as claimed in claim 2, further comprising a preliminary learning step (24) during which the speed decrease detection criterion and the pressure increase detection criterion are defined by comparing vehicle speed measurements and pressure measurements associated with said speed measurements.

4. The method as claimed in claim 3, in which the vehicle speed measurements and the pressure measurements, according to which the speed decrease detection criterion and the pressure increase detection criterion are defined, are performed at a start of commissioning of the pressure sensor (11).

5. The method as claimed in claim 4, in which the vehicle speed decrease detection criterion is verified when deceleration is greater as an absolute value than a predefined threshold.

6. The method as claimed in claim 4, in which a pressure increase detection criterion is verified when the pressure increase is greater than a predefined threshold, preferably a threshold of 10 kilopascals.

7. The method as claimed in claim 4, in which the vehicle speed decrease detection criterion is verified when deceleration is greater as an absolute value than a predefined threshold of 0.3 g, in which g is gravitational acceleration.

8. The method as claimed in claim 3, in which the vehicle speed decrease detection criterion is verified when deceleration is greater as an absolute value than a predefined threshold.

9. The method as claimed in claim 3, in which a pressure increase detection criterion is verified when the pressure increase is greater than a predefined threshold, preferably a threshold of 10 kilopascals.

10. The method as claimed in claim 3, in which the vehicle speed decrease detection criterion is verified when deceleration is greater as an absolute value than a predefined threshold of 0.3 g, in which g is gravitational acceleration.

11. The method as claimed in claim 2, in which the vehicle speed decrease detection criterion is verified when deceleration is greater as an absolute value than a predefined threshold.

12. The method as claimed in claim 2, in which pressure increase detection criterion is verified when the pressure increase is greater than a predefined threshold, preferably a threshold of 10 kilopascals.

13. The method as claimed in claim 2, in which the step (22) of notifying that a malfunction of the pressure sensor (11) has been detected is executed when the pressure variation detection criterion has not been verified a number of times consecutively.

14. The method as claimed in claim 2, in which the vehicle speed decrease detection criterion is verified when deceleration is greater as an absolute value than a predefined threshold of 0.3 g, in which g is gravitational acceleration.

15. The method as claimed in claim 1, in which the step (22) of notifying that a malfunction of the pressure sensor (11) has been detected is executed when the pressure variation detection criterion has not been verified a number of times consecutively.

16. A device (1) for detecting a malfunctioning of a sensor (11) of a pressure of a gas inside a tire of a vehicle, comprising:
    means for determining whether a predefined gas temperature variation detection criterion is verified,
    means for determining whether a predefined criterion for detection of a pressure variation, measured by a pressure sensor, is verified, implemented when a temperature variation has been detected, and
    means for notifying that a malfunction of the pressure sensor (11) has been detected, implemented when a pressure variation has not been detected.

17. The device (1) as claimed in claim 16, further comprising means (15) for measuring the variation of the speed of the vehicle, and in which:
    the gas temperature variation detection criterion is a vehicle speed decrease detection criterion,
    the pressure variation detection criterion is a pressure increase detection criterion.

18. The device (1) as claimed in claim 17, further comprising means for defining the speed decrease detection criterion and the pressure increase detection criterion by comparing vehicle speed measurements and pressure measurements associated with said speed measurements.

* * * * *